United States Patent

[11] 3,549,803

| [72] | Inventors | Cletus A. Becht;<br>Robert M. Emerick, Akron; James A.<br>Horton; James E. Mount, Cuyahoga Falls;<br>Roderic H. O'Connor, Akron, Ohio |
|---|---|---|
| [21] | Appl. No. | 688,444 |
| [22] | Filed | Dec. 6, 1967 |
| [45] | Patented | Dec. 22, 1970 |
| [73] | Assignee | Goodyear Aerospace Corporation<br>Akron, Ohio<br>a corporation of Delaware |

[54] VIRTUAL IMAGE SYSTEM FOR TRAINING SIMULATOR
2 Claims, 4 Drawing Figs.

[52] U.S. Cl. .................................................. 178/7.88,
350/174; 178/7.89
[51] Int. Cl. ..................................................... H01j 29/89
[50] Field of Search .......................................... 178/7.88;
350/310, 288; 161/160, 161, 1t

[56] References Cited
UNITED STATES PATENTS
3,432,219 3/1969 Shenker et al. ............... 178/7.88
FOREIGN PATENTS
1,024,347 3/1966 Great Britain ................ 88/105
637,411 1/1964 Belgium ....................... 350/288

*Primary Examiner*—Richard Murray
*Assistant Examiner*—Donald E. Stout
*Attorney*—J. G. Pere ABSTRACT: This invention relates to a reflective type of virtual image display for simulators and trainers which is achieved by using large diameter, lightweight mirrors arranged in conjunction with any input display image to achieve a virtual image.

VIRTUAL IMAGE SYSTEM FOR TRAINING SIMULATOR

PRIOR ART

Heretofore it has been known that there have been many and various types of simulators utilizing virtual images, but for the most part, these systems have been quite complex, and have required large and expensive equipment for mounting the mirrors and other optical equipment because of the large weight involved. Providing adjustment of such equipment to achieve the desired virtual image is also extremely difficult because of the large weight involved. These prior art systems have not been adaptable for moving base-type simulators because of their large and cumbersome nature and weight. A lightweight, readily adjustable, virtual image simulation training device capable of being transported is needed by the art.

The general object of the present invention is to avoid and overcome the foregoing and other difficulties of and objections to the prior art practices by providing a virtual image display system which is light in weight and readily adjustable so that it may be transported.

A further object of the invention is to utilize large sections of lightweight aluminized spheres made from a plastic foam which can be readily fabricated into a lightweight frame structure, and adjustable therein to provide a virtual image display simulator of low cost, high adaptability and great flexibility.

A further object of the invention is to provide a virtual image simulator system which can be very easily constructed, is portable, and highly adjustable to provide for image display from a cathode ray tube, a conventional movie screen, or other well known display systems, all at much less cost and with much greater reliability than prior art systems.

The aforesaid objects of the invention and other objects which will become apparent as the description proceeds are achieved by providing in a simulator apparatus the combination of a frame, a large lightweight aluminized mirror formed as a spherical section mounted in adjustable relation to the frame, an optically transparent beam splitter adjustably mounted to the frame in approximately 45° relationship thereto whereby a portion of the image is reflected into and out of the mirror and through the beam splitter to form a virtual image on the side of the beam splitter opposite the mirror.

For a better understanding of the invention, reference should be had to the accompanying drawings wherein.

Figure 1:
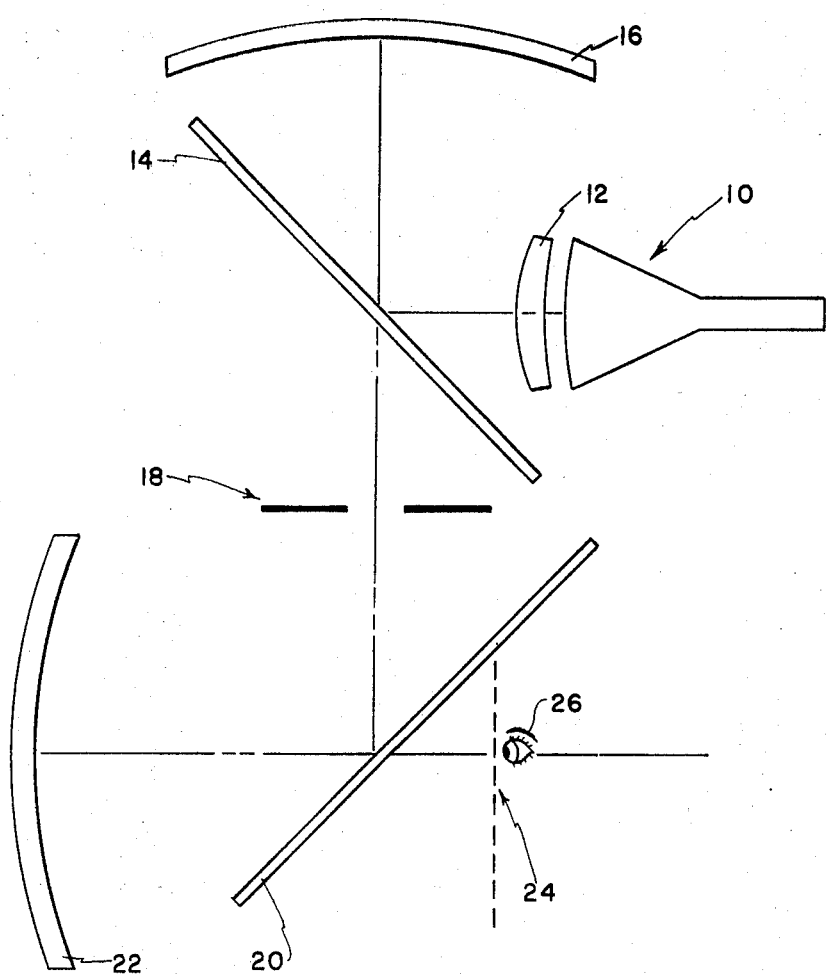
FIG. 1 is a schematic indication of the optical elements comprising the system of the invention.

With reference to the optical schematic shown in FIG. 1 of the drawings, the numeral 10 indicates a suitable TV monitor driven from some desired outside source which may utilize a field lens 12 as necessary to correct the curvature of the input scene to the curvature requirements of the mirrors in the simulator apparatus as a whole. The image corrected by the lens 12 passes into a beam splitter 14. The beam splitter 14 is one of those conventional optically clear or transparent glass devices well known in the art and made by Liberty Mirror, Division of Libby-Owens Ford, Toledo, Ohio. Essentially, the beam splitter passes approximately 50 percent of the light impinging thereon and reflects the other portion of the image at a reflection angle equal to the angle of incidence, which in this case reflects it directly into a carefully positioned very large projection mirror 16. The beam splitter 14 is mounted at an acute angled relation of between about 35° to 55° to the diametric chord of the concave side of the mirror 16. The structure of the mirror 16 will be more fully explained hereinbelow, but suffice it to say that it is a spherical section fabricated of lightweight plastic material having a thin layer of specular material bonded to the surface and shall be constructed as a one piece laminate. Normally, for the purposes of the invention, the mirror 16 will be at least a 48-inch mirror. The mirror 16 projects a spherical image back through the beam splitter 14 and also defines a predetermined system aperture indicated generally by lines 18. The image projected then has about 50 percent thereof reflected off a second beam splitter 20 of the same type as beam splitter 14 and into an eyepiece mirror 22 which is of substantially the same construction and size as the projection mirror 16. The energy reflected from the eyepiece mirror 22 then passes through the beam splitter 20 and forms a virtual image at a viewing station defined by dotted lines 24.

To an individual 26 positioned at the viewing station 24, the system is designed to present a virtual image having a field of view between 30° to 60° vertically by between 60° to 150° horizontally. The design capability is to have an optimum field of view of 45° vertically by 110° horizontally. The exit pupil for the virtual image will be at least 6 inches in diameter and at the exit pupil, approximately 6 percent of the intensity of the input image will be present because of the amount lost passing through the beam splitters and reflecting off the mirror surfaces. The system is capable of operating with a high resolution so as to operate with standard television systems, images projected onto a screen, or actual objects, and of course, is capable of full color presentation.

The system is confined to a fixed image size, and hence enlargement or reduction of the virtual image display can only be changed by adjusting the size of the scene.

Figure 2:
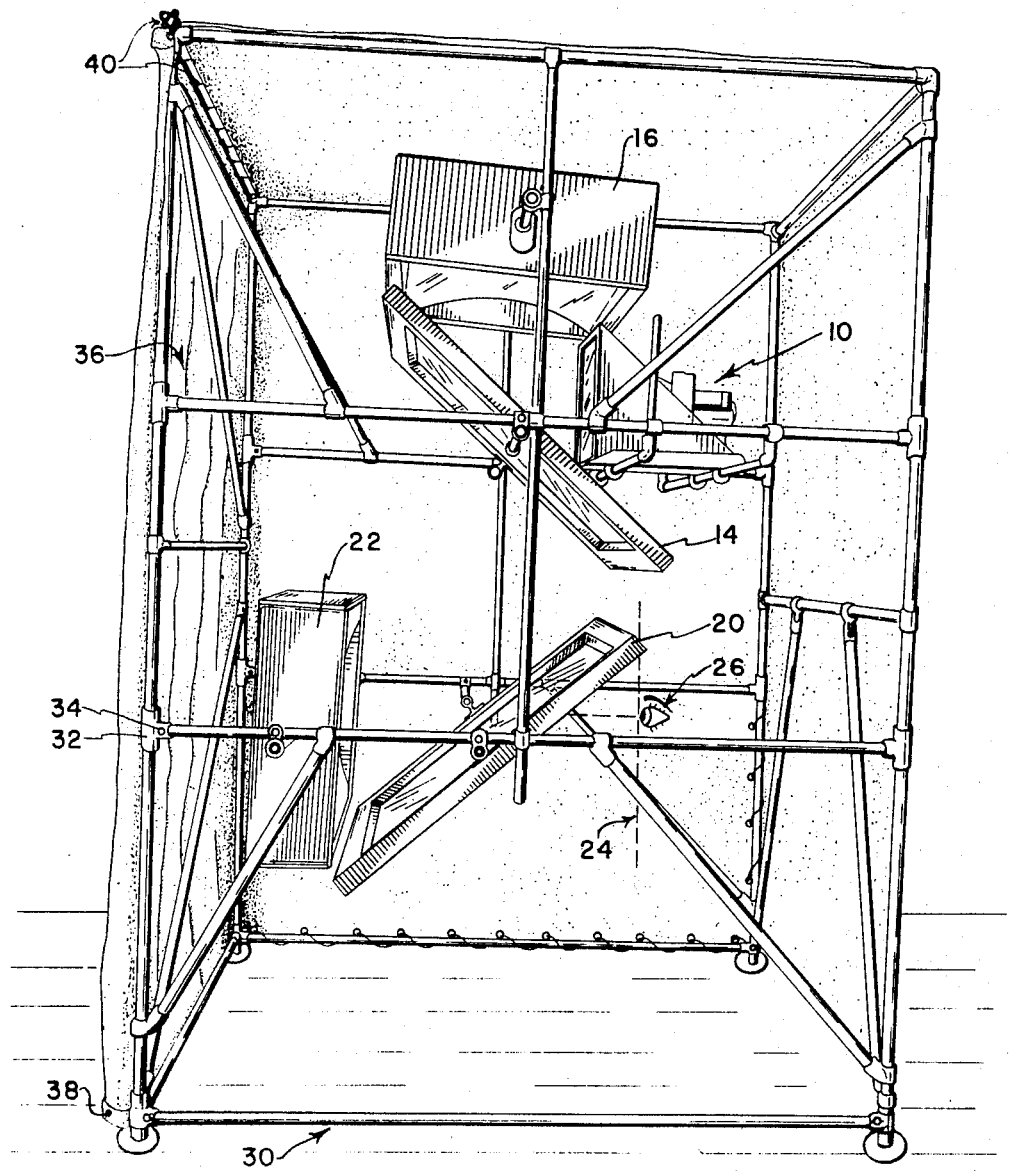
FIG. 2 is a side elevational view of actual structure incorporating the principles of the schematic of FIG. 1.

The actual positioning of the mirrors, beam splitters, and image projection system within a frame is most clearly illustrated with respect to FIG. 2 of the drawings. Specifically, the frame which is indicated generally by the numeral 30 is rectangularly shaped and approximately 7 ft. long × 4 ½ ft. wide × 10 ft. high. Tubular pipe sections are utilized for the frame, and depending upon the material utilized, the frame weight will vary accordingly. Utilizing iron pipe, the assembled weight of the framework will be approximately 340 lbs. and the estimate weight of the complete system about 600 lbs. The type of construction being used lends itself readily to easy adjustment and positioning of the optical components, as sliding socket fittings 32 held in position by socket head setscrews 34 are utilized to allow sliding adjustment of the components relative to the basic tubular frame 30. The framework 30 is built up from standard 1 inch pipe simply cut to the proper lengths with no threading required. Sections are held together with slip-type fittings 32. The sliding features of these fittings lend themselves readily to the adjustment feature previously mentioned. Since the frame work can be assembled on site, the maximum weight of any one piece to be handled will be less than 20 lbs.

An enclosure will be provided in the form of a laced-on tarpaulin 36 will afford a dust cover, and exclude outside light when viewing the display. Material may consist of a water repellent duck. Grommets 38 will be provided at suitable spacing for lacing the material with rope 40 to the pipe framework 30 as indicated in FIG. 2. Entrance to the viewing area will be provided with a loose flap for easy accessibility.

Suitable frames, preferably made from wood, are provided for the mirrors, the beam splitters, and the field lenses. The wood provides a lightweight and adequately durable frame for these components. Again, the attachment of the wooden frames to the pipe frame 30 will be by standard sliding socket type pipe fittings.

As an important feature of the invention, the actual structure of the large diameter mirrors 16 and 22 is quite important to achieve the lightweight structure desired with a high degree of optical perfection. For an understanding of a preferred embodiment of this structure, reference should be had to FIG. 3 of the drawings which shows that the mirror actually comprises a laminate consisting of an aluminum layer 52 laminated to an inner plastic film 54. The film aluminum laminate is then rigidized by utilizing a high density plastic foam backed by a low density plastic foam, these indicated as layers 56 and 58, respectively.

The fabrication technique for this lightweight mirrored surface of a spherical section is to form a circular envelope from an aluminum layer laminated onto a layer of plastic film. It has been found that Mylar, a transparent polyester film made by E. I. Du Pont de Nemours and Co. which has been metallized or aluminized, and is formed to the spherical shape by bonding gored sections together into a completely enclosed envelope can then be inflated to a given pressure such that the reflector portion which is free of the gored sections is extended to the desired spherical contour. If a large enough sheet of plastic film of sufficient thickness is available then it is not necessary to use gored sections. At this point, polyurethane or other suitable type foaming ingredients are mixed together and poured onto the convex plastic outside of the reflector portion of the inflated shape. The liquid flows out over the film in a uniform layer and quickly forms and hardens. It is very important that a highly smooth specular reflective surface is maintained in the metallized film, and this is achieved by making the first layer rather thin and of dense foam which provides toughness and dent resistance for the mirror surface. Also, it has been found that if an ordinary low density rather thick foam layer is applied directly without the thin dense coat first, surface smoothness is poor because of the larger cell structure. The plastic film on the inside of the aluminum reflective layer holds the layer in firm position during the inflating stretching process and subsequently when the desired section is cut from the final foamed structure. In some instances, it may be desirable to provide an outer plastic film layer 50 so that the metallized reflective surface may be protected from scratching or being damaged by atmospheric conditions. It is to be noted that this technique produces lightweight mirrors of at least about 48 inches in diameter which weigh only about one-fifth to one-tenth as much as correspondingly sized glass mirrors.

Figures 3, 4:
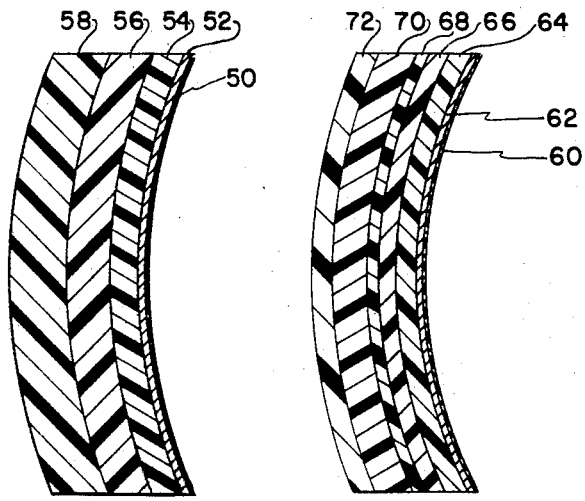
FIG. 3 is a cross-sectional illustration of the structure comprising the lightweight mirror assembly taken substantially on line 3-3 of FIG. 2.
FIG. 4 is a cross-sectional illustration of a modified laminated lightweight mirror assembly.

An alternative mirror structure which has also proven to be extremely lightweight and highly effective is illustrated in FIG. 4. In this laminate a mylar layer 60 has an aluminized coating 62 in the usual manner, with this being backed and formed by four alternating layers of epoxy and high density foam, indicated by numerals 64—70, respectively. It is interesting to note that the best thickness structure for layers 64—70 is for epoxy layer 64 to be about twice the thickness of epoxy layer 68, whereas foam layer 66 is only about one-half the thickness of foam layer 70. The entire laminate is then backed by a layer 72 of resin impregnated fiber glass. It has been found that using this laminate arrangement a large mirror of spherical section will weigh about 16 lbs. per cubic ft. which is about one-fifth to one-tenth the weight of a corresponding glass mirror.

It should be understood, however, that the thickness of the material carrying the reflecting layer will vary with the size and shape of the reflector being formed as well as the concomitant preforming properties of the material. Also, of course, various and sundry layers of the foam and epoxy layers can be utilized to conform to the physical demands for the reflector.

Thus, it is seen that a lightweight, portable, yet highly effective virtual image simulation system has been disclosed which represents distinct improvements over the existing art. However, it is to be understood that the invention is not limited thereto or thereby, but that the inventive scope is defined in the appended claims.

We claim:

1. A simulator apparatus which comprises a frame, a first mirror formed as a concave section, means mounting said first mirror in manual horizontal, vertical and tilting adjustable relation to the frame, a first optically transparent beam splitter, means mounting said beam splitter to the frame in manually adjustable relation to an acute angled relation of between 35° to 55° to the concave side of the mirror, means to project an image towards the beam splitter whereby a portion of the image is reflected into and out of the mirror and through the beam splitter such that a virtual image is viewable from the side of the beam splitter opposite the mirror, a second mirror and second beam splitter, means mounting both said second mirror and beam splitter in manually adjustable relation to the frame with the second beam splitter in substantially the same relation to the second mirror as the first beam splitter is to the first mirror and both positioned in relation to the first mirror and beam splitter whereby the virtual image is viewable from the side of the second beam splitter opposite the concave side of the second mirror, means adjustably mounting the means to project an image with respect to the first mirror, and where each mirror is at least 48 inches in diameter, and weighs one-tenth as much as a glass mirror of corresponding size, and where each mirror is formed from a plastic sheet having an aluminumized layer laminated thereto with a laminated plastic foam rigidizing the plastic sheet in the shape of a concave section.

2. A simulator apparatus according to claim 1 where the frame is movable, and includes means to cover the frame to keep light from the apparatus.